(12) United States Patent
Cui et al.

(10) Patent No.: US 10,608,959 B2
(45) Date of Patent: Mar. 31, 2020

(54) SECURELY MANAGING AND DIAGNOSING NETWORK MIDDLEBOXES

(71) Applicant: VMware, Inc., Palo Alto, CA (US)

(72) Inventors: Leon Cui, Beijing (CN); Siddharth Ekbote, San Jose, CA (US); Todd Sabin, Morganville, NJ (US); Weiqing Wu, Cupertino, CA (US); Uday Masurekar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 109 days.

(21) Appl. No.: 15/701,396

(22) Filed: Sep. 11, 2017

(65) Prior Publication Data

US 2019/0081912 A1    Mar. 14, 2019

(51) Int. Cl.
| | |
|---|---|
| *H04L 12/931* | (2013.01) |
| *G06F 11/00* | (2006.01) |
| *G06F 21/62* | (2013.01) |
| *G06F 9/455* | (2018.01) |
| *H04L 12/24* | (2006.01) |
| *H04L 29/06* | (2006.01) |
| *G06F 11/07* | (2006.01) |
| *G06F 21/82* | (2013.01) |

(52) U.S. Cl.
CPC .......... *H04L 49/70* (2013.01); *G06F 9/45558* (2013.01); *G06F 11/008* (2013.01); *G06F 21/6218* (2013.01); *H04L 41/0226* (2013.01); *H04L 41/28* (2013.01); *H04L 63/0263* (2013.01); *G06F 11/0766* (2013.01); *G06F 21/82* (2013.01); *G06F 2009/45595* (2013.01); *H04L 41/0813* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 7,661,131 | B1 * | 2/2010 | Shaw | H04L 63/029 709/220 |
| 9,306,949 | B1 * | 4/2016 | Richard | H04L 63/0272 |
| 9,424,062 | B1 * | 8/2016 | Mummidi | G06F 9/45558 |
| 9,602,344 | B1 * | 3/2017 | Iyengar | G06F 8/76 |
| 9,832,802 | B2 * | 11/2017 | Kreiner | H04W 72/048 |
| 9,912,755 | B2 * | 3/2018 | Chandwani | H04L 63/0281 |

(Continued)

*Primary Examiner* — Ayaz R Sheikh
*Assistant Examiner* — Tarell A Hampton
(74) *Attorney, Agent, or Firm* — Patterson + Sheridan, LLP (57) ABSTRACT

The disclosure provides an approach for managing and diagnosing middleboxes in a cloud computing system. In one embodiment, a network operations center, that is located remote to a virtualized cloud computing system and communicates with the cloud computing system via a wide area network, controls network middleboxes in the cloud computing system through a secure routing module inside a gateway of the cloud computing system. The secure routing module is configured to receive, from an authenticated management application and via a secure communication channel, packets intended for managing network middleboxes. In turn, the secure routing module establishes secure communication channels with the target middleboxes, translates the identified packets to protocols and/or application programming interfaces (APIs) of the target middleboxes, and transmits the translated packets to the target middleboxes.

16 Claims, 5 Drawing Sheets

(56) References Cited

U.S. PATENT DOCUMENTS

| | | | | |
|---|---|---|---|---|
| 9,952,885 | B2* | 4/2018 | Chanda | G06F 9/455 |
| 10,009,443 | B1* | 6/2018 | Guigli | G06F 9/5077 |
| 10,148,496 | B2* | 12/2018 | Tiwari | H04L 41/0806 |
| 10,148,740 | B2* | 12/2018 | Wei | G06Q 30/016 |
| 2012/0096271 | A1* | 4/2012 | Ramarathinam | H04L 63/0807 713/172 |
| 2012/0209947 | A1* | 8/2012 | Glaser | G06F 9/5027 709/217 |
| 2014/0068602 | A1* | 3/2014 | Gember | G06F 9/45558 718/1 |
| 2014/0101301 | A1* | 4/2014 | Wanser | H04L 43/04 709/224 |
| 2014/0108665 | A1* | 4/2014 | Arora | H04L 67/141 709/227 |
| 2015/0172093 | A1* | 6/2015 | Kaneko | H04L 41/5051 709/226 |
| 2015/0189000 | A1* | 7/2015 | Grunenberger | G06F 9/5027 709/201 |
| 2015/0334034 | A1* | 11/2015 | Smedley | H04L 49/10 709/219 |
| 2016/0234250 | A1* | 8/2016 | Ashley | H04L 63/105 |
| 2016/0274951 | A1* | 9/2016 | Koizumi | G06F 9/50 |
| 2017/0180382 | A1* | 6/2017 | Taylor | H04L 63/101 |
| 2018/0375644 | A1* | 12/2018 | Karagiannis | H04L 9/083 |

* cited by examiner

SECURELY MANAGING AND DIAGNOSING NETWORK MIDDLEBOXES

BACKGROUND

In private virtualized computing centers, sometimes referred to as on-premise data centers, devices such as network middleboxes have traditionally been managed by an IT administrator through a network operations center (NOC) or network operating secure center (NOSC). As used herein, a network middlebox is a physical or virtual intermediary networking device performing functions other than the normal, standard functions of an IP router on the datagram path between a source device and a destination device. A router is defined as a networking device that forwards data packets between nodes in a computer network and/or between computer networks. A middlebox may transform, inspect, filter, or otherwise manipulate traffic for purposes other than packet forwarding. Examples of middleboxes include firewalls and similar security devices, load balancers, network optimizers (such as wide area network optimizers), protocol accelerators, intrusion detection systems, intrusion prevention systems, and proxy/caches. Such middleboxes may be managed by, e.g., configuring, updating, monitoring, diagnosing, and controlling the middleboxes.

Middleboxes are conventionally connected to an internal management network and to a data network. The management network is for managing components of the computing system, such as the middleboxes, and the data network is for transferring other data not related to management. The data network is typically connected to an external wide area network (WAN), such as the Internet, while the management network is private to the computing system. The management network may further be separated from the data network by a security "layer" or "gap," which prevents external users from modifying devices in the computing system.

Virtualized computing systems have begun to move from on-premise infrastructures to cloud-based infrastructures. The distinction between "on-premise" and "cloud" is that on-premise infrastructures are typically accessed by users through a local area network (LAN), while cloud-based infrastructures are typically accessed by users through a WAN. Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

As virtualized computing systems have moved from on-premise infrastructures to cloud infrastructures, IT administrators have had to manage middleboxes through remote NOCs that are connected to a virtualized cloud computing system through an external WAN. However, the external WAN is typically not connected to the management network of the cloud computing system for security reasons, making management and diagnosis of middleboxes, which traditionally relied on such management networks, difficult.

Additionally, middleboxes in computing systems are often provided by third-parties (i.e., parties other than those responsible for managing the virtualized cloud computing system), and each middlebox may have its own protocol and API. An IT administrator who wishes to manage middleboxes may then need to communicate with each middlebox using its own protocol and API. The multitude of protocols and APIs used by third-party middleboxes can make managing the middleboxes difficult.

SUMMARY

One or more embodiments provide a method of managing a network middlebox in a computing system. The method generally includes receiving a network packet from a management application via a first secure communication channel. The method further includes, responsive to determining the received packet includes a request for managing the network middlebox: translating the received packet to at least one of a protocol or an application programming interface (API) associated with the network middlebox, and transmitting the translated packet to the network middlebox via a second secure communication channel.

Further embodiments include a non-transitory computer-readable storage medium storing instructions that, when executed by a computer system cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
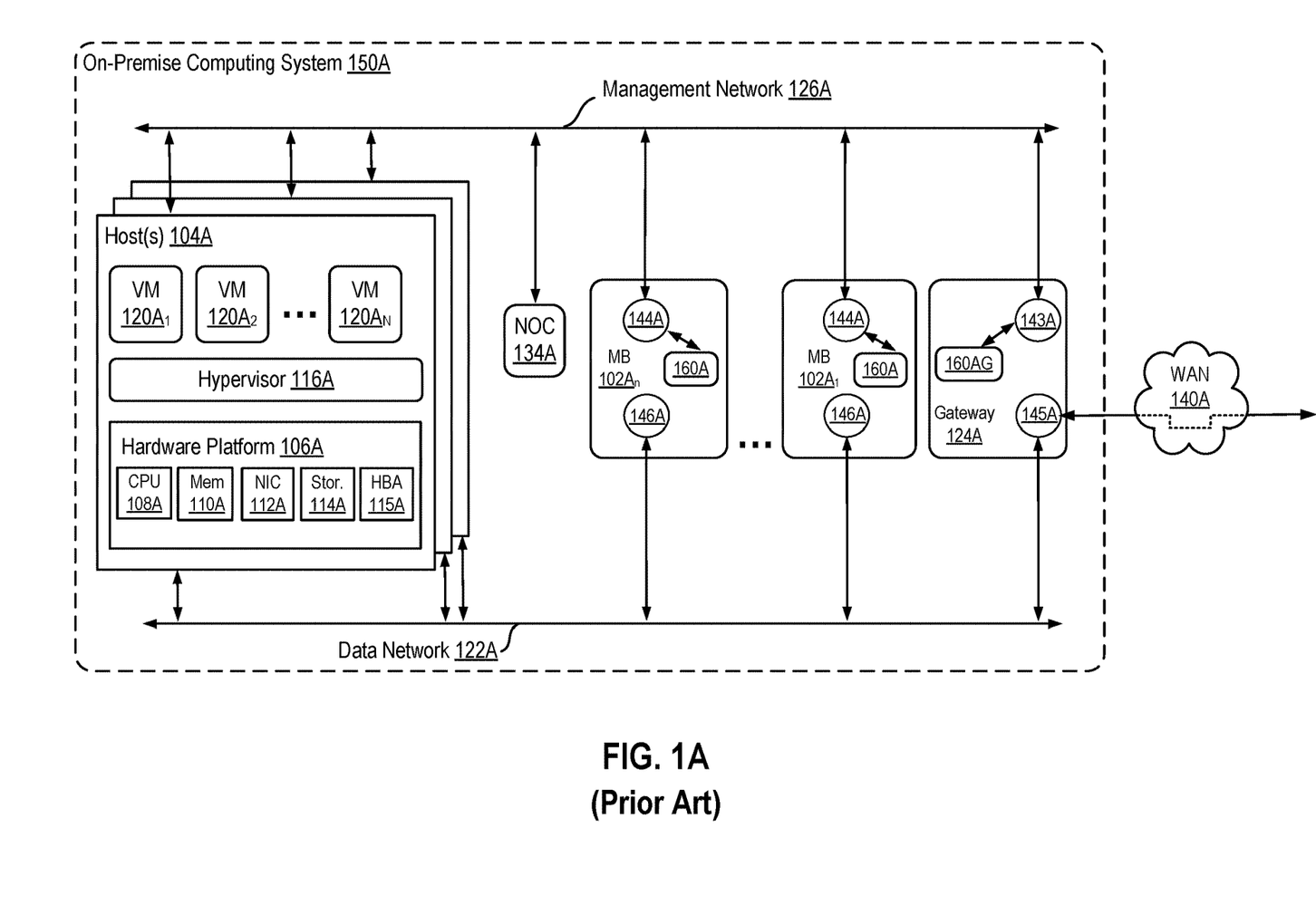
FIG. 1A is a block diagram of an on-premise virtualized computing system, depicting the prior art.

FIG. 1A is a block diagram of an on-premise virtualized computing system 150A, showing technology known in the prior art. As shown, on-premise computing system 150A includes one or more host computer systems ("hosts 104"). Hosts 104A may each be constructed on a server grade hardware platform 106A, such as an x86 architecture platform. As shown, hardware platform 106A of each host 104A may include conventional components of a computing device, such as one or more processors (CPUs) 108A, system memory 110A, a network interface 112A, storage system 114A, optionally a host bus adapter (HBA) 115A, and other I/O devices such as, for example, a mouse and keyboard (not shown). CPU 108A is configured to execute instructions, for example, executable instructions that perform one or more operations described herein and that may be stored in memory 110A and in local storage 114A. Memory 110A is a device allowing information, such as executable instructions, cryptographic keys, configurations, and other data, to be stored and retrieved. Memory 110A is where programs and data are kept when the processor is actively using them. Memory 110A may include, for example, one or more random access memory (RAM) modules. Network interface 112A enables host 104A to communicate with another device via a communication medium, such as through data network 122A or management network 126A within on-premise computing system 150A. Network interface 112A may include one or more network adapters, also referred to as Network Interface Cards (NICs). Storage system 114A represents persistent storage devices (e.g., one or more hard disks, flash memory modules, solid state disks, and optical disks).

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of a host 104 by VMs 120. One example of a hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104. Although some embodiments are described herein with respect to VMs, it should be understood that principles and techniques disclosed herein may also be used with other appropriate virtual computing instances (e.g., containers (e.g., Docker containers), data compute nodes, isolated user space instances, namespace containers, etc.).

Gateway 124A is a physical or virtual gateway device such as a router (e.g., executing as a virtual appliance) and is configured to provide VMs 120A and other components in on-premise computing system 150A with connectivity to an external wide area network (WAN) 140A (e.g., the Internet). Gateway 124A may manage external public IP addresses for VMs 120A and middleboxes 102A, and route traffic incoming to and outgoing from on-premise computing system 150A as well as provide networking services, such as firewalls, network address translation (NAT), dynamic host configuration protocol (DHCP), and load balancing.

As shown, gateway 124A includes a management interface 143A and a data interface 143A. As used herein, an "interface" refers to a network interface such as a physical or virtual NIC, with an associated network address and a port, that provides functions such as passing messages, connecting and disconnecting, and the like. A network address is an identifier for a node in a network, and may include an IP address and/or a MAC address. In the case of a virtual gateway appliance, management interface 143A and data interface 145A may be different virtual NICs (VNICs) of the virtual gateway appliance. It should be understood that such VNICs may be software abstractions of physical NICs that are responsible for exchanging packets between VMs (in which the VNICs are) and hypervisors. Each VM may be connected to virtual ports provided by a virtual switch through its VNICs, and the virtual switch may further be connected to a physical network interface to allow network traffic to be exchanged between VMs and other network destinations such as VMs hosted in other physical host computers, or other VMs executing in the same host computer.

As shown, management interface 143A is bound with a management IP address and is connected to management module 160AG, which provides management capabilities, such as configuration, visibility (statistics/status), and troubleshooting. That is, NOC 134 (that an IT administrator interacts with) may manage and/or diagnose gateway 124A via management interface 143, as described below. For instance, to change settings on the security service of gateway 124A, an IT administrator can log into gateway 124A using NOC 134A and configure the security service.

Data interface 145A, which as shown is connected to data network 122A and WAN 140A, handles other, non-management traffic. That is, management interface 143A of gateway 124A provides a network address and port combination through which NOC 134A can manage gateway 124A, while data interface 145A of gateway 124A provides a network address and port combination through which transfer of non-management (non-control) data packets to and from gateway 124 occurs. As shown, data interface 145A is not connected to and does not otherwise communicate with management module 160AG of gateway 124A, which means gateway 124A cannot be managed through data interface 145A. Illustratively, gateway 124A is configured such that data cannot pass between data interface 145A and management interface 143A, creating a security gap or layer between these interfaces 143A and 145A.

Network operations center (NOC) 134A is a control center that is utilized by administrators (e.g., who interact with a user interface) of on-premise computing system 150A to monitor, manage and/or control devices, such as middleboxes $102A_1$ to $102A_N$ and gateway 124A. A device may be a physical device or a virtualized device. Although an NOC is shown, it should be understood that other management applications may also be used, such as an network operating secure center (NOSC). For example, an IT administrator may utilize various software management applications (e.g., VMware™ vCenter Operations Manager™, vCloud Director™, vCloud Automation Center™) to monitor the operation and/or health of the various devices in the virtualized computing system infrastructure. Such management software allows, for example, the management of multiple ESX servers and virtual machines from different ESX servers through a single console application. If problems associated with devices arise, the IT administrator may access the devices from NOC 134A to attempt to fix the devices. NOC 134A is configured to carry out administrative tasks for on-premise computing system 150A, including managing hosts 104A, managing VMs 120A running within each host 104A, provisioning VMs, migrating VMs from one host to another host, and load balancing between hosts 104A. NOC 134A may communicate with middleboxes 102A, gateway 124A, and hosts 104A via management network 126A.

On-premise computing system 150A includes one or more middleboxes $102A_1$ to $102A_N$. As described, a network middlebox, such as middlebox 102A, is a physical or virtual intermediary device performing functions other than the normal, standard functions of an IP router on the datagram path between a source host and destination host. Network middleboxes are also sometimes referred to as network appliances. Middleboxes often provide security and/or performance benefits. Virtual middleboxes in particular may be self-functional virtual appliances (VM images with pre-configured software application(s)) which may be connected into a network to provide, e.g., traffic shaping services.

Each middlebox 102A in on-premise computing system 150A has a management interface 144A and data interface 146A. In the case of virtual middleboxes, the management interface 144A and data interface 146A may be different virtual NICs of the virtual middlebox appliance. Management interface 144A is bound with a management IP address and is connected to management module 160A. Management module 160A exposes management capabilities (e.g., configuration, visibility (statistics/status), troubleshooting). It should be understood that requests to manage and diagnose a middlebox 102A may be sent to middlebox 102A via its management interface 144A. The management requests may be sent from a NOC 134A, as described above. For example, to change settings on the firewall service of one of the middleboxes 102A, an IT administrator can log into that middlebox 102A through NOC 134A and configure the firewall.

Data interface 146A sits in an inline/one-arm mode and performs, e.g., traffic shaping. Data interface 146A is not connected to and does not have access to management module 160A, which means middlebox 102A cannot be managed through access to data interface 146A. Each middlebox 102A is configured such that data cannot pass between data interface 146A and management interface 144A. Overall, this results in a security gap or layer that exists between interfaces 144A and 146A. Similar to data interface 145A of gateway 124, data interfaces 146A of middleboxes 102 are connected to data network 122A. Data interfaces 146A allow transfer of conventional non-management (non-control) data packets. For example, compressed data from WAN 140A may be routed to one of middleboxes 102A via data interface 146A, and that middlebox 102A may then provide WAN optimization decompression or other services on the data before the data is routed to its ultimate destination.

As shown in FIG. 1A, no connectivity exists between management interface 144A and data interface 146A of each middlebox 102A, or between management interface 143A and data interface 145A of gateway 124A, which serves to securely separate management network 126A and data network 122A. Management network 126A is a private, internal network in on-premise computing system 150A. By contrast, data network 122A is connected to WAN 140A through data interface 145A of gateway 124A. As a result, data network 122A is more vulnerable to attack by external, unauthorized users (e.g., hackers). To prevent external, unauthorized users from being able to control devices located in on-premise computing system 150A, connectivity between management interface 144A and data interface 146A of each middlebox, and between management interface 143A and 145A of gateway 124 in on-premise computing system 150A is maintained at a "no connectivity" setting, creating a security layer or gap between management network 126A and data network 122A.

As described above in the Background section, new issues arise when virtualized computing systems, such as 150A, move from on-premise to a cloud-based infrastructure. Cloud-based infrastructures are often managed remotely through a WAN such as WAN 140A. This means that devices can no longer be managed exclusively via an internal, private management network 126A securely separated from data network 122A and WAN 140A, such as that shown in FIG. 1A. Designers of cloud computing systems must instead compromise between security of devices and manageability of the devices present on a virtualized cloud computing system.

Figure 1B:
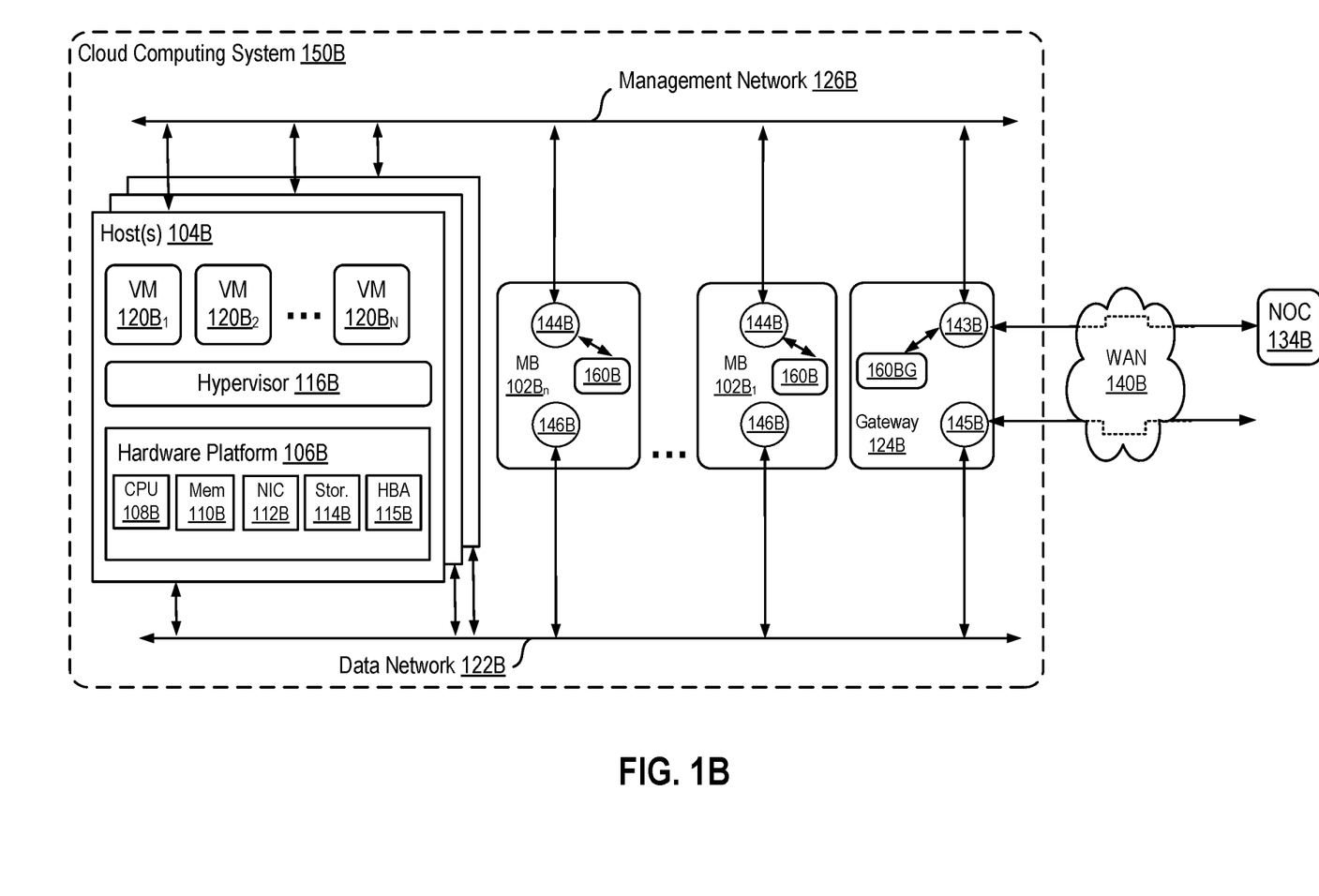
FIG. 1B is a block diagram of a virtualized cloud computing system depicting a low-security, high-manageability solution to managing cloud-based middleboxes.

FIG. 1B depicts a virtualized cloud computing system 150B that implements a low-security, high-manageability approach to managing middleboxes 102B located in the cloud. Components of cloud computing system 150B (e.g., hosts 104B, middleboxes 102B, etc.) are similar to corresponding components (e.g., hosts 104A, middleboxes 102A, etc.) in on-premise computing system 150A described above with respect to FIG. 1A, and descriptions of identical functionalities of components in cloud computing system 150B as those in on-premise computing system 150A are omitted for brevity.

In contrast to NOC 134A and data network 122A in FIG. 1A, NOC 134B is located remote to cloud computing system 150B. NOC 134B communicates with gateway 124B through WAN 140B using the address and port combination of management interface 143B of gateway 124B. When gateway 124B receives a management packet from NOC 134B via management interface 143B, the management packet is used to manage (e.g., configure or obtain diagnostic information from, according to the request in the management packet) gateway 124B and/or is passed through management network 126B to middleboxes 102B for managing the same. That is, NOC 134B is able to manage gateway 124B and middleboxes 102B through the ports associated with management interfaces 143B, 144B, respectively.

The approach illustrated in FIG. 1B provides a low-security, high-manageability approach to managing middleboxes 102B. If an unauthorized user is able to disguise a packet as appearing to originate from NOC 134B and establishes a connection to the port associated with management interface 143B, then the unauthorized user may gain control of cloud computing system 150B. As a result, the approach of FIG. 1B is unsatisfactory due to its low security.

Figure 1C:
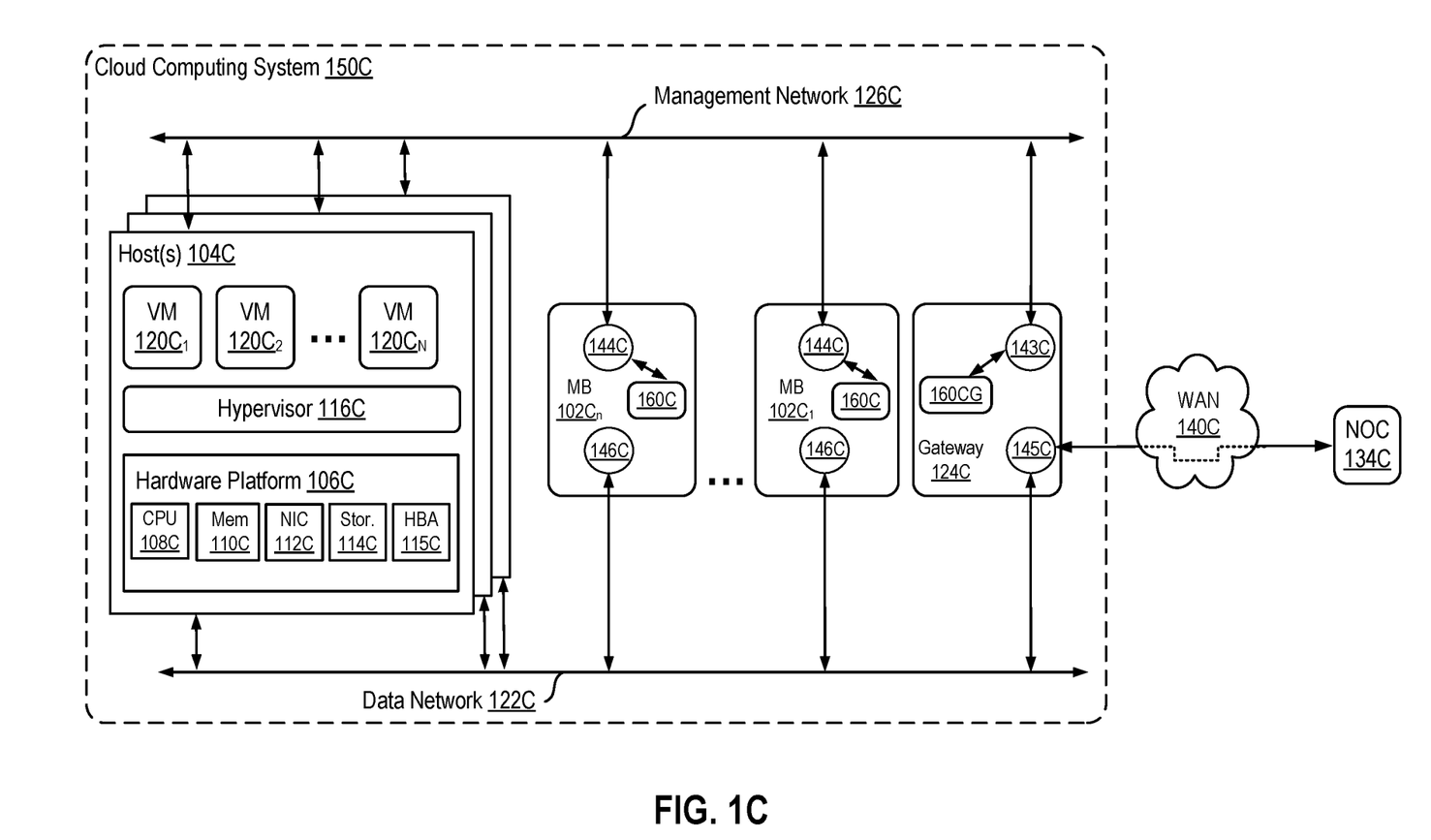
FIG. 1C is a block diagram of a virtualized cloud computing system depicting a high-security, low-manageability solution to managing cloud-based middleboxes.

FIG. 1C depicts another approach to managing middleboxes 102C located in the cloud. FIG. 1C depicts a virtualized cloud computing system 150C that implements a high-security, low-manageability approach to managing middleboxes 102C located in the cloud. Components of cloud computing system 150C (e.g., hosts 104C, middleboxes 102C, etc.) are similar to corresponding components (e.g., hosts 104A, middleboxes 102A, etc.) in on-premise computing system 150A, and descriptions of identical functionalities of components in cloud computing system 150C as those in on-premise computing system 150A are omitted for brevity.

In contrast to NOC 134A and data network 122A in FIG. 1A, NOC 134C is located remote to cloud computing system 150C and can only communicate with the address and port combination of data interface 145C of gateway 124C through the WAN 140C. When gateway 124C receives a management packet from NOC 134C via interface 145C, the management packet is not processed by management module 160CG, and as a result, is not used to manage gateway 124C and/or is not passed through management network 126C to manage middleboxes 102C. That is, the approach depicted in FIG. 1C is essentially the opposite of that depicted in FIG. 1B. A security layer or gap is maintained between management interface 144C and data interface 146C of middleboxes 102C. Doing so provides security, as external, unauthorized users cannot gain control of middleboxes 102C. However, manageability becomes impossible or very difficult, as NOC 134C is remote to cloud computing system 150C and communicates with data interface 145C over the WAN 140C. As the same time, NOC 134C does not have access to management network 126C, similarly to how an external, unauthorized user would be excluded from management network 126C. That is, NOC 134C cannot communicate with middleboxes 102C via management interfaces 144C that are connected to management network 126C to manage and/or diagnose the middleboxes 102C. As a result, the middleboxes 102C essentially become black boxes that are difficult or impossible to configure or diagnose, rather than providing the usual management and diagnostic capabilities of the middleboxes.

Figure 2:
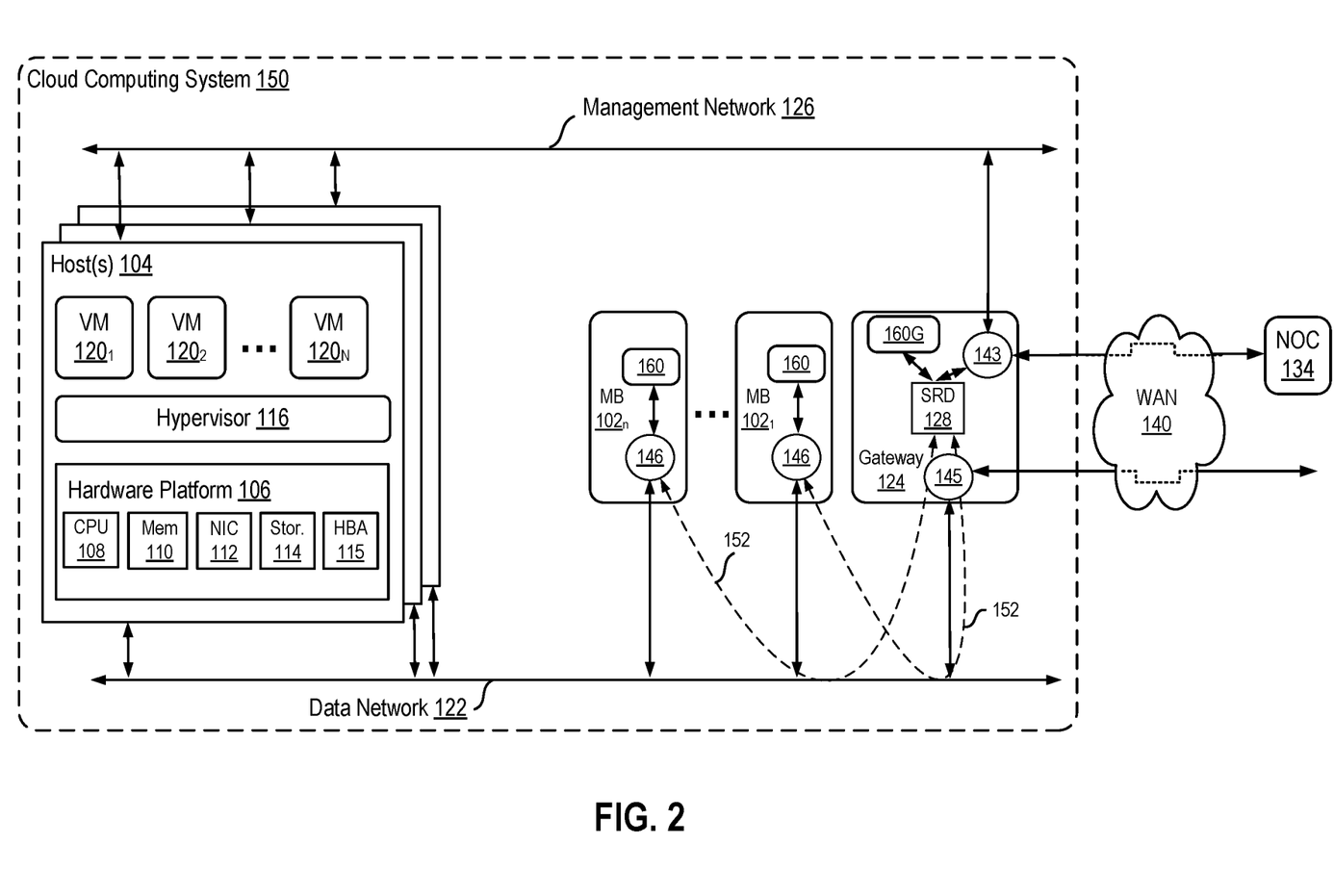
FIG. 2 is a block diagram of a virtualized cloud computing system in which one or more embodiments of the present disclosure may be utilized, depicting a balanced approach to securely manage cloud-based middleboxes.

FIG. 2 is a block diagram of a virtualized cloud computing system 150 in which one or more embodiments of the present disclosure may be utilized. FIG. 2 depicts an approach to managing and diagnosing middleboxes 102 that attempts to balance the interests of security and manageability. Components of cloud computing system 150 (e.g., hosts 104, middleboxes 102, etc.) are similar to corresponding components (e.g., hosts 104A, middleboxes 102A, etc.) in on-premise computing system 150A, and descriptions of identical functionalities of components in cloud computing system 150 as those in on-premise computing system 150A are omitted for brevity.

In contrast to on-premise computing system 150A, NOC 134 is located remote to cloud computing system 150, and management interfaces of middleboxes 102 no longer exist (or their corresponding ports are closed). This improves the security surface of each middlebox 102, as having less access points (ports) open to a device minimizes security risk to that middlebox. As shown, NOC 134 communicates with gateway 124 over WAN 140 using the address and port combination of management interface 143. When gateway 124 receives a management packet from NOC 134 via management interface 143, the management packet may be used to manage gateway 124 itself or one of middleboxes 102. Management packets are not allowed to reach middleboxes 102 (or to be used to manage gateway 124 itself) without first being processed by a software module in gateway 124, shown as secure router daemon (SRD) 128. SRD 128 is responsible for authenticating and creating secure communication channels (e.g., SSH or HTTPS channels) with NOC 134 and middleboxes 102, and forwarding permitted management packets to the appropriate middleboxes 102 (or for consumption by gateway 124 itself), as further described below. That is, gateway 124 is configured such that data cannot pass between data interface 145A and management interface 143A without going through SRD 128, which is a custom security layer that attempts to balance the interests of security and manageability of middleboxes 102. As SRD 128 permits gateway 124 to perform more than the standard functions of an IP router, gateway 124 may itself be considered a "middlebox" for the purposes of this disclosure.

As shown, each middlebox 102 is disconnected from management network 126, and is only connected to data network 122. Each middlebox 102 may only have a single port open, which is used to connect to data network 122. With only a single port open, the security surface of each middlebox 102 is minimized, increasing the security of middleboxes 102. In addition, the single port opened for each middlebox may be configured to only allow traffic sourced from gateway 124. For example, a firewall rule in middlebox 102 may be configured to only allow traffic from gateway 124. Given this, middlebox 102 provides management access and traffic shaping for only the associated gateway 124, over data network 122. As a result of the single port that only allows traffic sourced from gateway 124, there is a minimum security surface, and gateway 124 also acts as an extra firewall in front of middleboxes 102.

As described, gateway 124 includes SRD 128, a service that adds functionality to gateway 124 and allows for secure management of middleboxes 102. Only a single port may be opened in gateway 124 that NOC 134 can use to communicate with management interface 143 through WAN 140. For example, port 9443 or 443 for Hyper Text Transfer Protocol Secure (HTTPS), or port 22 for Secure Shell (SSH) may be opened, and gateway 125 may listen on such a port for management requests from NOC 134. Further, NOC 134 communicates with gateway 124 and SRD 128 therein through a secure channel, such as an HTTPS or SSH channel, that requires authentication of NOC 134 (e.g., using a Public Key Certificate (PKC) or SSH keys). Although specific protocols are given as examples herein, it should be understood that, in general, any protocols may be used (e.g., any L4/L7 protocols, such as HTTPS, SSL RPC and SSH, or proprietary protocols, such as VIX or VMCI). When a packet is received from NOC 134, SRD 128 determines the target middlebox 102 of the received packet. NOC 134 also resolves an API and/or protocol of the target middlebox 102, and translates a request from NOC 134 into the API and/or protocol of the target middlebox 102 before forwarding the translated request to the target middlebox through another secure channel. It should be understood that, by authenticating and communicating with NOC 134 through a secure channel, SRD 128 is able to prevent management requests from unauthorized entities (who are not authenticated) from being forwarded to middleboxes 102. In addition, as SRD 128 processes management packets, SRD 128 may be used to permit only certain, allowed requests to pass to middleboxes 102 and be used to manage the same (or to manage gateway 124 itself).

It should be understood that, in order to access a target middlebox 102 for management purposes, SRD 128 may first prompt NOC 134 for a username and password of the target middlebox 102, or SRD 128 may use a locally stored user/password pair to log into the target middle 102. Storing user/password pairs locally is generally less secure.

Figure 3:
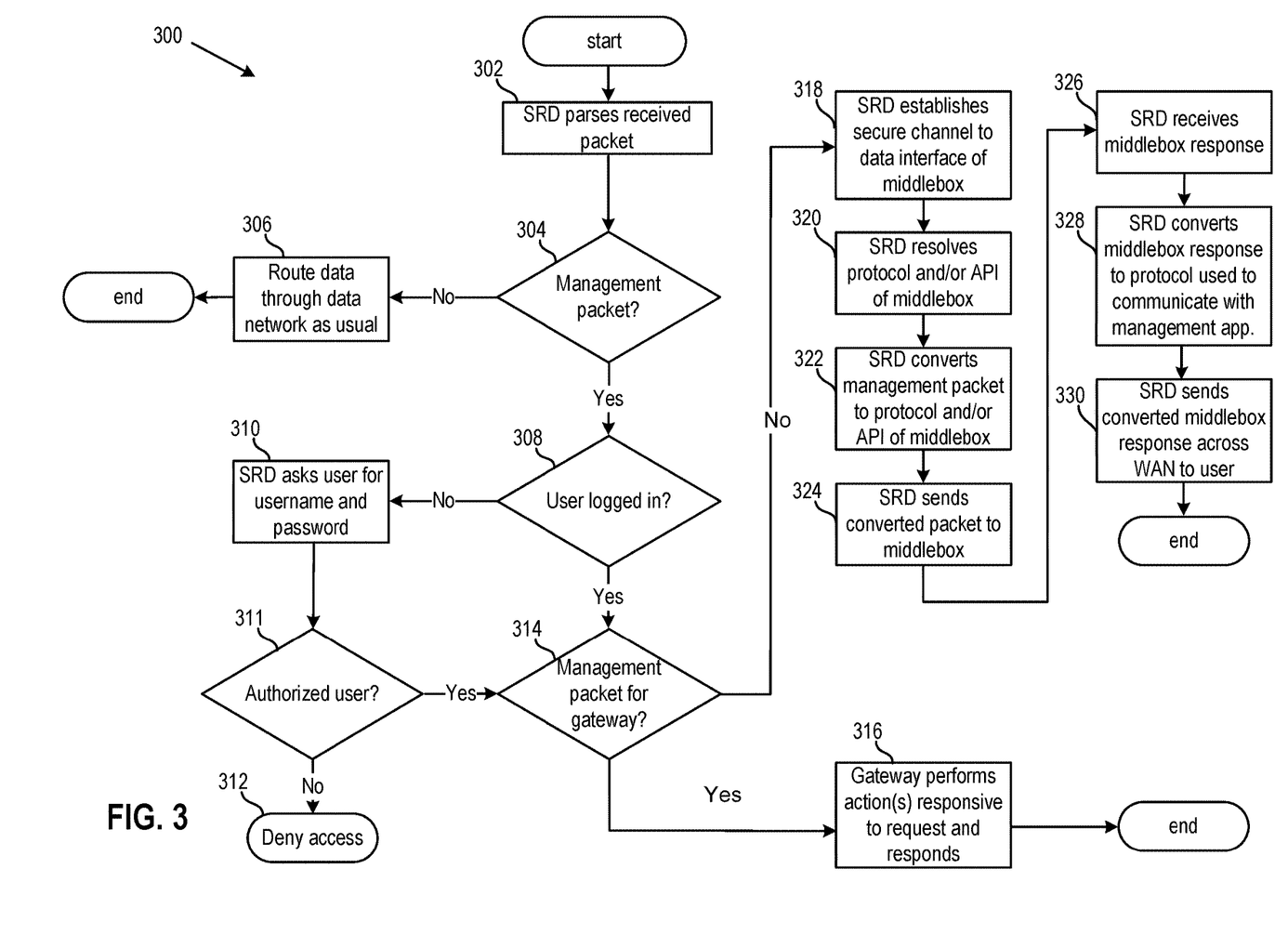
FIG. 3 is a flow diagram depicting a method of processing a packet by a gateway of a virtualized cloud computing system, according to an embodiment.

FIG. 3 depicts a flow diagram of a method 300 for processing a packet received by gateway 124 of virtualized cloud computing system 150, according to an embodiment. The solution depicted in FIG. 2 and FIG. 3 attempts to balance the interests of security and manageability, while providing for a simplified NOC 134 for ease of middlebox 102 management and diagnosis.

As shown, method 300 begins at step 302 where, after gateway 124 receives a network packet from NOC 304 through management interface 143, SRD 128 parses the received packet. As described, NOC 134 communicates with gateway 124 and SRD 128 therein through a secure channel, such as an HTTPS or SSH channel, that requires authentication of NOC 134 (e.g., using a Public Key Certificate (PKC) or SSH keys). As a result, SRD 128 may prevent unauthorized external users who are pretending to be NOC 134 but are not authenticated from sending management requests to middleboxes 102.

Then, at step 304, SRD 128 uses results of its parsing at step 302 to determine whether the network packet is a management packet sent from NOC 134 to manage a device, such as a middlebox 102. As used herein, a "management packet" is a network packet including a request from NOC 134 to configure a device in a virtualized computing system, such as cloud computing system 150, or to obtain diagnostic information (e.g., statistics or status) from such a device. By contrast, a "data packet" is a network packet that does not include such a request.

For an example of parsing, if the received packet includes a URL such as /middlebox/ . . . or /sshproxy/?middlebox=true, then SRD 128 may determine that the packet is a management packet and then create a request, such as an HTTPS request, to the appropriate middlebox 102, or decode SSH data and forward such data to an SSH port of the appropriate middlebox 102. Inspecting the URL is one technique that, for some protocols such as HTTPS, can be used to determine whether the packet is a management packet. For other protocols, other approaches may be employed, such as inspecting the payload of the packet.

In addition to identifying whether the received packet is a management packet, SRD 128 may also determine the particular target middlebox being managed, which may also be specified in the packet. For example, the request URL GET/status?middlebox=wanopt may indicate that the target middlebox is the WAN optimizer middlebox.

If the network packet is not a management packet, then at step 306, gateway 124 routes the network packet to its next destination, as per routing function of a conventional network router. On the other hand, if the network packet is a management packet, then at step 308, SRD 128 determines whether NOC 134 (i.e., the IT administrator attempting to manage a device, such as middlebox 102) is already logged in to the target device. That is, SRD 128 determines whether NOC 134 had previously sent proper authorization credentials and been logged in to the target device.

If NOC 134 has not been logged in to the target device, then at step 310, SRD 128 asks NOC 134 to log in using authorization credentials, such as a username and password pair. SRD 128 then attempts, at step 311, to log in to the target using authorization credentials from NOC 134, which may or may not work depending on whether the credentials received from NOC 134 are proper. If the authorization credentials are improper, then at step 312, access to the target device is denied. If, on the other hand, proper authorization credentials are received, then method 300 continues to step 314.

At step 314, SRD 128 determines whether the received management packet is for accessing management interface 143 of gateway 124. It should be understood that to manage gateway 124, NOC 134 may first be logged in to management interface 143 of gateway 124 using authorization credentials received from NOC 134. However, other methods of adding security to a connection to host 104 may be employed, such as requiring separate authorization credentials for each host 104 in place of or in addition to logging into management interface 143 of gateway 124.

If SRD 128 determines that the management packet is for accessing management interface 143 of gateway 124, then at step 316, gateway 124 interprets the management packet, performs by itself action(s) that are requested in the management packet, and responds to NOC 134. The action(s) performed by gateway 124 may include, for example, changing a configuration of gateway 124, sending status or statistics information about gateway 124 back to NOC 134, or creating a connection to one of the hosts 104 for NOC 134 to manage that host 104. In another embodiment, SRD 128 may be responsible for processing the request in the management packet and either permitting or not permitting (e.g., based on predefined rules) the request from being used to control gateway 124 or from being forwarded to a target middlebox 102, thereby providing another layer of security.

On the other hand, if SRD 128 determines at step 314 that the management packet is for managing middlebox 102 (and assuming that the management packet includes a permitted request), then at step 318, SRD 128 establishes a secure channel 152 through data interface 145 of gateway 124 and data network 122 to data interface 146 of the target middlebox 102. As described, middleboxes 102 are configured to link data interface 146 to management module 160, allowing access to management module 160 through data interface 146. In addition, a single port may be opened for each of the middleboxes 102 in data network 122 in one embodiment. The secure channel connecting gateway 124 and the target middlebox may include point-to-point encryption techniques, such as Secure Sockets Layer (SSL) or IPSec, and/or require authentication credentials, such as a username and password pair described above to authenticate NOC 134.

At step 320, SRD 128 resolves the protocol and API of the target middlebox 102. In one embodiment, the resolution may be performed by examining information about the API and protocol of target middlebox 102 that has been pre-stored in SRD 128. Alternatively, SRD 128 may resolve the API and protocol of the target middlebox 102 by communicating with the target middlebox 102. Alternatively still, information about the API and protocol of the target middlebox 102 may be included within the network packet itself that is sent by NOC 134.

It should be understood that embodiments disclosed herein provide a simplified NOC 134 that only communicates with a single component of gateway 124, the SRD 128, for management of middleboxes 102. As a result, NOC 134 only has to be aware of, and to communicate in, the protocol and API (e.g., a RESTful API) of SRD 128 to be able to manage and diagnose gateway 124 and middleboxes 102. That is, NOC 134, as well as the IT administrator using NOC 134, do not need to be concerned with the APIs and protocols of each individual middlebox 102. As described, middleboxes 102 are often provided by third-parties (parties not responsible for managing cloud computing system 150), and each middlebox may have its own proprietary protocol and/or API. A variety of protocols and APIs can cause difficulty in managing many middleboxes directly through NOC 134. An intermediary SRD 128 that converts between management requests sent in a standard protocol to management requests of the protocol and/or API of each individual middlebox eases the process of managing middleboxes 102.

At step 322, SRD 128 converts the management packet to the protocol and/or API of target middlebox 102. Then, at step 324, SRD 128 sends the converted packet through secure channel 152 to the data interface 146 of the target middlebox 102.

At step 326, the target middlebox 102 performs requested action(s) in the management packet, and then sends a response, such as an acknowledgement or diagonstic information about target middlebox 102, back to SRD 128.

At step 328, SRD 128 converts the target middlebox 102 response to a protocol used to communicate with NOC 134. At step 330, SRD 128 sends the converted response back to NOC 134 across WAN 140. NOC 134 may then output the response to, e.g., a display screen for the IT administrator to see.

Although not depicted in FIG. 3, it is contemplated that after the IT administrator is done managing the target device, such as middlebox 102, NOC 134 will send a logout signal to SRD 128, logging out NOC 134 from the device being managed and closing secure channel 152. Additional security measures for logging out may be used, such as logging out NOC 134 and closing secure channel 152 after a certain time period, or after a certain time period of inactivity.

Advantageously, techniques disclosed herein balance the interests of security and manageability of middleboxes on a virtualized computing system. In particular, techniques disclosed herein permit IT administrators to have insight into the internals of cloud computing system middleboxes (e.g., statistics and status) and control such middleboxes, including configuration, inspection, and diagnostics, while providing security through authentication of the management application and communicating via secure channels. The middleboxes themselves may be isolated, with only data network connectivity, and only a single port is required to be opened in a management network for a gateway device and in a data network for a middlebox, thereby minimizing the security surface. In addition, NOCs need to be aware of and communicate in only the protocol and API of the gateway service to be able to manage and diagnose middleboxes, including the gateway itself.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method of managing a network middlebox in a computing system, comprising:
receiving a network packet from a management application via a first secure communication channel established with the management application; and
responsive to determining the received packet includes a request for managing the network middlebox:
translating the received packet to at least one of a protocol or an application programming interface (API) associated with the network middlebox,
determining that the management application has been authenticated to communicate with the network middlebox prior to transmitting the translated packet, and
transmitting the translated packet to the network middlebox via a second secure communication channel established with the network middlebox.

2. The method of claim 1, wherein:
the determining, translating, and transmitting steps are performed by a gateway in the computing system; and
the gateway authenticates the management application.

3. The method of claim 2, wherein:
a single port is opened in the network middlebox; and
the single port is configured to only allow packets from the gateway.

4. The method of claim 2, wherein a single port is opened in the gateway for communicating with the management application over a wide area network (WAN).

5. The method of claim 2, wherein the gateway is a virtual appliance.

6. The method of claim 1, further comprising, determining the request for managing the network middlebox is permitted to be transmitted to the network middlebox.

7. The method claim 1, wherein the received packet is transmitted from the management application, located remote to the computing system, over a wide area network (WAN).

8. The method of claim 1, wherein the translated packet is transmitted to the network middlebox via a data network through which packets that do not include requests for managing network middleboxes are also transmitted.

9. The method of claim 1, wherein the request specifies at least one of a configuration change for the network middlebox or diagnostic information to collect from the network middlebox.

10. A non-transitory computer-readable storage medium comprising instructions, which when executed by a computer system, causes the computer system to carry out operations for managing a network middlebox, comprising:
receiving a network packet from a management application via a first secure communication channel established with the management application; and
responsive to determining, by a virtual gateway appliance that authenticates the management application, the received packet includes a request for managing the network middlebox:
translating, by the virtual gateway appliance, the received packet to at least one of a protocol or an application programming interface (API) associated with the network middlebox, and
transmitting, by the virtual gateway appliance, the translated packet to the network middlebox via a second secure communication cannel established with the network middlebox, wherein:
a single port is opened in the network middlebox; and
the single port opened in the network middlebox is configured to only allow packets from the gateway appliance.

11. The computer-readable storage medium of claim 10, wherein a single port is opened in the gateway appliance for communicating with the management application over a wide area network (WAN).

12. The computer-readable storage medium of claim 10, the operations further comprising, determining that the management application has been authenticated to communicate with the network middlebox, prior to translating the received packet and transmitting the translated packet.

13. The computer-readable storage medium of claim 10, the operations further comprising, determining the request for managing the network middlebox is permitted to be transmitted to the network middlebox.

14. The computer-readable storage medium of claim 10, wherein the translated packet is transmitted to the network middlebox via a data network through which packets that do not include requests for managing network middleboxes are also transmitted.

15. The computer-readable storage medium of claim 10, wherein the request specifies at least one of a configuration change for the network middlebox or diagnostic information to collect from the network middlebox.

16. A computer-implemented method of managing a network middlebox in a computing system, comprising:
receiving a network packet from a management application via a first secure communication channel established with the management application; and
responsive to determining the received packet includes a request for managing the network middlebox:
translating the received packet to at least one of a protocol or an application programming interface (API) associated with the network middlebox, and
transmitting the translated packet to the network middlebox via a second secure communication channel established with the network middlebox, wherein the translated packet is transmitted to the network middlebox via a data network through which packets that do not include requests for managing network middleboxes are also transmitted.

* * * * *